US012532667B2

United States Patent
Liu et al.

(10) Patent No.: US 12,532,667 B2
(45) Date of Patent: Jan. 20, 2026

(54) MAGNETIC STORAGE STRUCTURE, MAGNETIC STORAGE ARRAY STRUCTURE AND CONTROL METHOD THEREOF, AND MEMORY

(71) Applicant: CHANGXIN MEMORY TECHNOLOGIES, INC., Hefei (CN)

(72) Inventors: Xiaoyang Liu, Hefei (CN); Xiaoguang Wang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 488 days.

(21) Appl. No.: 18/153,350

(22) Filed: Jan. 11, 2023

(65) Prior Publication Data

US 2024/0065111 A1 Feb. 22, 2024

Related U.S. Application Data

(63) Continuation of application No. PCT/CN2022/118569, filed on Sep. 13, 2022.

(30) Foreign Application Priority Data

Aug. 22, 2022 (CN) .......................... 202211009132.1

(51) Int. Cl.
*H10N 50/10* (2023.01)
*G11C 11/16* (2006.01)
(Continued)

(52) U.S. Cl.
CPC ......... *H10N 50/10* (2023.02); *G11C 11/1673* (2013.01); *G11C 11/1675* (2013.01); *H10B 61/20* (2023.02); *H10N 50/85* (2023.02)

(58) Field of Classification Search
CPC ........ H10N 50/10; H10N 50/85; H10B 61/20; G11C 11/1673; G11C 11/1675
(Continued)

(56) References Cited

U.S. PATENT DOCUMENTS

2019/0115060 A1 4/2019 Deshpande et al.
2021/0273156 A1\* 9/2021 Chen ..................... H10N 50/10
(Continued)

FOREIGN PATENT DOCUMENTS

CN 106663468 A 5/2017
CN 111354392 A 6/2020
(Continued)

*Primary Examiner* — Jami Valentine Miller
(74) *Attorney, Agent, or Firm* — Kilpatrick Townsend & Stockton LLP

(57) ABSTRACT

Embodiments provide a magnetic storage structure, a magnetic storage array structure, a control method, and a memory. The magnetic storage structure includes: two magnetic tunnel junctions, each of which includes a fixed layer and a free layer; spin-orbit coupling layers in one-to-one correspondence with the two magnetic tunnel junctions, where each of the spin-orbit coupling layers is positioned on a side of the free layer away from the fixed layer; a first transistor and a second transistor, where one of the spin-orbit coupling layers is electrically connected to a source terminal or a drain terminal of the first transistor, other one of the spin-orbit coupling layers is electrically connected to a source terminal or a drain terminal of the second transistor; and a third transistor, where a source terminal or a drain terminal of the third transistor is electrically connected to the fixed layers in the two magnetic tunnel junctions.

15 Claims, 4 Drawing Sheets

(51) Int. Cl.
*H10B 61/00* (2023.01)
*H10N 50/85* (2023.01)

(58) Field of Classification Search
USPC .......................................... 257/421
See application file for complete search history.

(56) References Cited

U.S. PATENT DOCUMENTS

2021/0311139 A1* 10/2021 Suess ..................... H10N 50/10
2022/0115438 A1* 4/2022 Li .......................... H10N 50/20
2025/0176192 A1* 5/2025 Lille ....................... H10N 50/20

FOREIGN PATENT DOCUMENTS

| CN | 111489777 A | 8/2020 |
| CN | 112186098 A | 1/2021 |
| CN | 112382319 A | 2/2021 |
| CN | 112767980 A | 5/2021 |
| CN | 112802515 A | 5/2021 |
| CN | 112956030 A | 6/2021 |

* cited by examiner

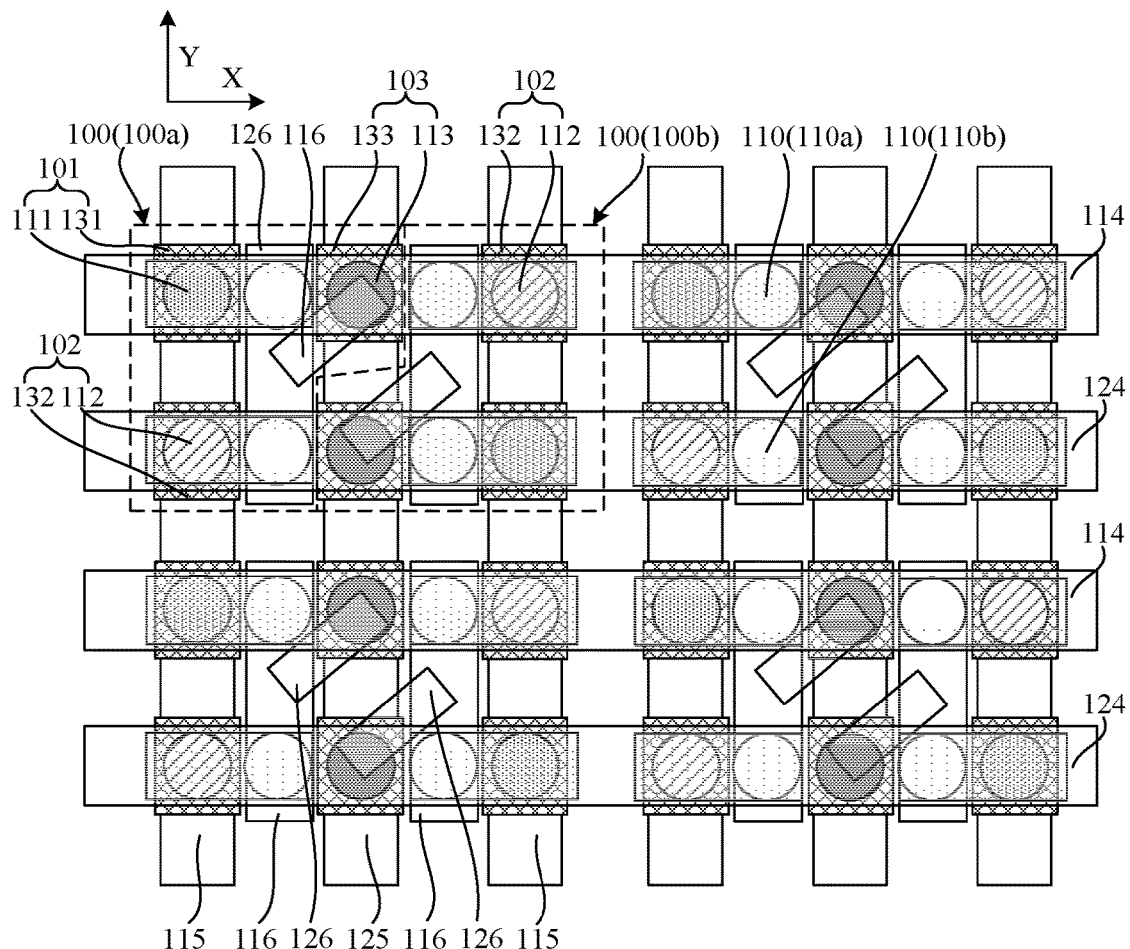

Fig. 4

Control one of the first transistor and the second transistor to be in the on state; control a current flowing through the spin-orbit coupling layer to set a state of one of the two magnetic tunnel junctions to be a high-resistance state or a low-resistance state, to implement a write operation on the magnetic tunnel junction, where the magnetic tunnel junction subjected to the write operation corresponds to the first transistor in the on state or the second transistor in the on state — S101

Control the third transistor to be in an on state, and read a magnitude of the current flowing through one of the two magnetic tunnel junctions to determine whether the magnetic tunnel junction is in the high-resistance state or the low-resistance state, to implement a read operation on the magnetic tunnel junction — S102

Fig. 5

MAGNETIC STORAGE STRUCTURE, MAGNETIC STORAGE ARRAY STRUCTURE AND CONTROL METHOD THEREOF, AND MEMORY

CROSS-REFERENCE TO RELATED APPLICATION

This application is a continuation of PCT/CN2022/118569, filed on Sep. 13, 2022, which claims priority to Chinese Patent Application No. 202211009132.1 titled "MAGNETIC STORAGE STRUCTURE, MAGNETIC STORAGE ARRAY STRUCTURE AND CONTROL METHOD THEREOF, AND MEMORY" and filed on Aug. 22, 2022, the entire contents of which are incorporated herein by reference.

TECHNICAL FIELD

Embodiments of the present disclosure relate to the field of semiconductor, and more particularly, to a magnetic storage structure, a magnetic storage array structure and a control method thereof, and a memory.

BACKGROUND

As a new type of solid-state nonvolatile memory, a magnetic random access memory (MRAM) has high-speed read and write characteristics, and is formed by means of characteristics of a magnetic tunnel junction (MTJ). The MRAM stores data by means of magnetic field polarization instead of charges. The MTJ includes a free layer, a tunneling layer, and a fixed layer. A magnetic field direction of the free layer may be changed, and a magnetic field direction of the fixed layer is unchanged. When the free layer and the fixed layer have the same magnetic field direction, the MTJ is in a low-resistance state. When the magnetic field direction of the free layer is opposite to the magnetic field direction of the fixed layer, the MTJ is in a high-resistance state. Therefore, it may be determined whether stored data is "0" or "1" by detecting a low or high resistance of the MTJ.

A conventional spin-transfer torque magnetic random access memory (STT-MRAM) transfers angular momentums of electrons to a magnetic material in the free layer by means of spin angular momentum transfer of the electrons, i.e., spin-polarized electron flow. With discovery of a spin-orbit torque effect, a spin-orbit torque magnetic random access memory (SOT-MRAM) is proposed. The SOT-MRAM generates a spin-transfer torque by means of spin flow induced by a charge flow on a basis of spin-orbit coupling to control a magnetic memory cell. However, how to increase layout density of MTJs in the MRAM is an urgent problem to be solved.

SUMMARY

Embodiments of the present disclosure provide a magnetic storage structure, a magnetic storage array structure and a control method thereof, and a memory.

According to some embodiments of the present disclosure, an aspect of the embodiments of the present disclosure provides a magnetic storage structure. The magnetic storage structure includes: two magnetic tunnel junctions, where each of the two magnetic tunnel junctions includes a fixed layer and a free layer; spin-orbit coupling layers in one-to-one correspondence with the two magnetic tunnel junctions, where each of the spin-orbit coupling layers is positioned on a side of the free layer away from the fixed layer; a first transistor and a second transistor, where one of the spin-orbit coupling layers is electrically connected to a source terminal or a drain terminal of the first transistor, other one of the spin-orbit coupling layers is electrically connected to a source terminal or a drain terminal of the second transistor; and a third transistor, where a source terminal or a drain terminal of the third transistor is electrically connected to the fixed layers in the two magnetic tunnel junctions.

According to some embodiments of the present disclosure, another aspect of the embodiments of the present disclosure also provides a magnetic storage array structure, which include a plurality of magnetic storage structures as described in any one of the foregoing embodiments. At least two of the plurality of magnetic storage structures are arranged at intervals along a first direction. At least two of the plurality of magnetic storage structures are arranged at intervals along a second direction, where adjacent two of the plurality of magnetic storage structures along the second direction are centrosymmetric, and the third transistor of one of the two magnetic storage structures and the first transistor of other one of the two magnetic storage structures are arranged at intervals along the second direction, or, adjacent two of the plurality of magnetic storage structures along the first direction are centrosymmetric, and the third transistor of one of the two magnetic storage structures and the third transistor of other one of the two magnetic storage structures are arranged at intervals along the second direction. The magnetic storage array structure further comprises: a first signal line and a second signal line extending along the first direction, where the magnetic storage structures arranged along the first direction are electrically connected to the same first signal line and the same second signal line; and a first control line and a second control line extending along the second direction, where the magnetic storage structures arranged along the second direction are electrically connected to the same first control line and the same second control line.

According to some embodiments of the present disclosure, still another aspect of the embodiments of the present disclosure also provides a read-write control method for a magnetic storage array structure. The control method comprises: controlling one of a first transistor and a second transistor to be in an on state; controlling a current flowing through a spin-orbit coupling layer to set a state of one of the two magnetic tunnel junctions to be a high-resistance state or a low-resistance state, to implement a write operation on the magnetic tunnel junction, where the magnetic tunnel junction subjected to the write operation corresponds to the first transistor in the on state or the second transistor in the on state; and controlling a third transistor to be in an on state, and reading a magnitude of the current flowing through one of the two magnetic tunnel junctions to determine whether the magnetic tunnel junction is in the high-resistance state or the low-resistance state, to implement a read operation on the magnetic tunnel junction.

BRIEF DESCRIPTION OF THE DRAWINGS

Exemplary descriptions of one or more embodiments are made by means of pictures in corresponding drawings, and these exemplary descriptions do not constitute a limitation on the embodiments. Unless otherwise stated, the pictures in the drawings do not constitute a scale limitation. Exemplary descriptions are made to one or more embodiments with reference to pictures in the corresponding drawings, and these exemplary descriptions do not constitute limitations on the embodiments. Unless otherwise stated, the figures in the accompanying drawings do not constitute a scale limitation. To describe the technical solutions of the embodiments of the present disclosure or those of the prior art more clearly, the accompanying drawings required for describing the embodiments will be briefly introduced below. Apparently, the accompanying drawings in the following description are merely some embodiments of the present disclosure. To those of ordinary skills in the art, other accompanying drawings may also be derived from these accompanying drawings without creative efforts.

FIG. 4 is another schematic top-down view of the magnetic storage structure corresponding to FIG. 2; and FIG. 5 is a flowchart of a read-write control method for a magnetic storage array structure according to another embodiment of the present disclosure.

DETAILED DESCRIPTION

It is found by analysis that a spin-orbit torque magnetic random access memory (SOT-MRAM) has better properties than a spin-transfer torque magnetic random access memory (STT-MRAM), and the SOT-MRAM has many advantages such as faster write speed, better breakdown resistance properties, better device reliability, non-volatility and the like. However, in the SOT-MRAM, a current path for performing a write operation on the SOT-MRAM is separated from a current path for performing the write operation on the SOT-MRAM, such that one magnetic memory cell needs two transistors to respectively control a read operation and the write operation. That is, generally the SOT-MARM implements the storage and read of one-byte data by means of a 2T-1R structure, which leads to a larger layout area of the single magnetic memory cell in the SOT-MRAM, and is disadvantageous to increasing an integration density and quantity of data stored of the magnetic memory cells in the SOT-MRAM.

Embodiments of the present disclosure provides a magnetic storage structure, a magnetic storage array structure and a control method thereof, and a memory. A first transistor, a second transistor and a third transistor in the magnetic storage structure share two magnetic tunnel junctions. The read operation on two magnetic tunnel junctions is implemented by means of the third transistor, and the write operation on the two magnetic tunnel junctions is implemented respectively by means of the first transistor and the second transistor. The write operation and the read operation on the two magnetic tunnel junctions are implemented by means of the three transistors on the whole. That is, storage and read of two-byte data are implemented by means of the three transistors and the two magnetic tunnel junctions, which is advantageous to reducing number of transistors needed to store and read the two-byte data, thereby increasing layout density of the magnetic tunnel junctions and the transistors in the magnetic storage structure, to increase quantity of the data stored in unit space of the magnetic storage structure.

The embodiments of the present disclosure will be described in detail below in conjunction with the accompanying drawings. However, a person of ordinary skill in the art may understand that in the embodiments of the present disclosure, many technical details are put forward such that a reader may better understand the embodiments of the present disclosure. However, the technical solutions requested to be protected by the embodiments of the present disclosure may also be implemented even without these technical details or various variations and modifications based on the following embodiments.

Figure 1:
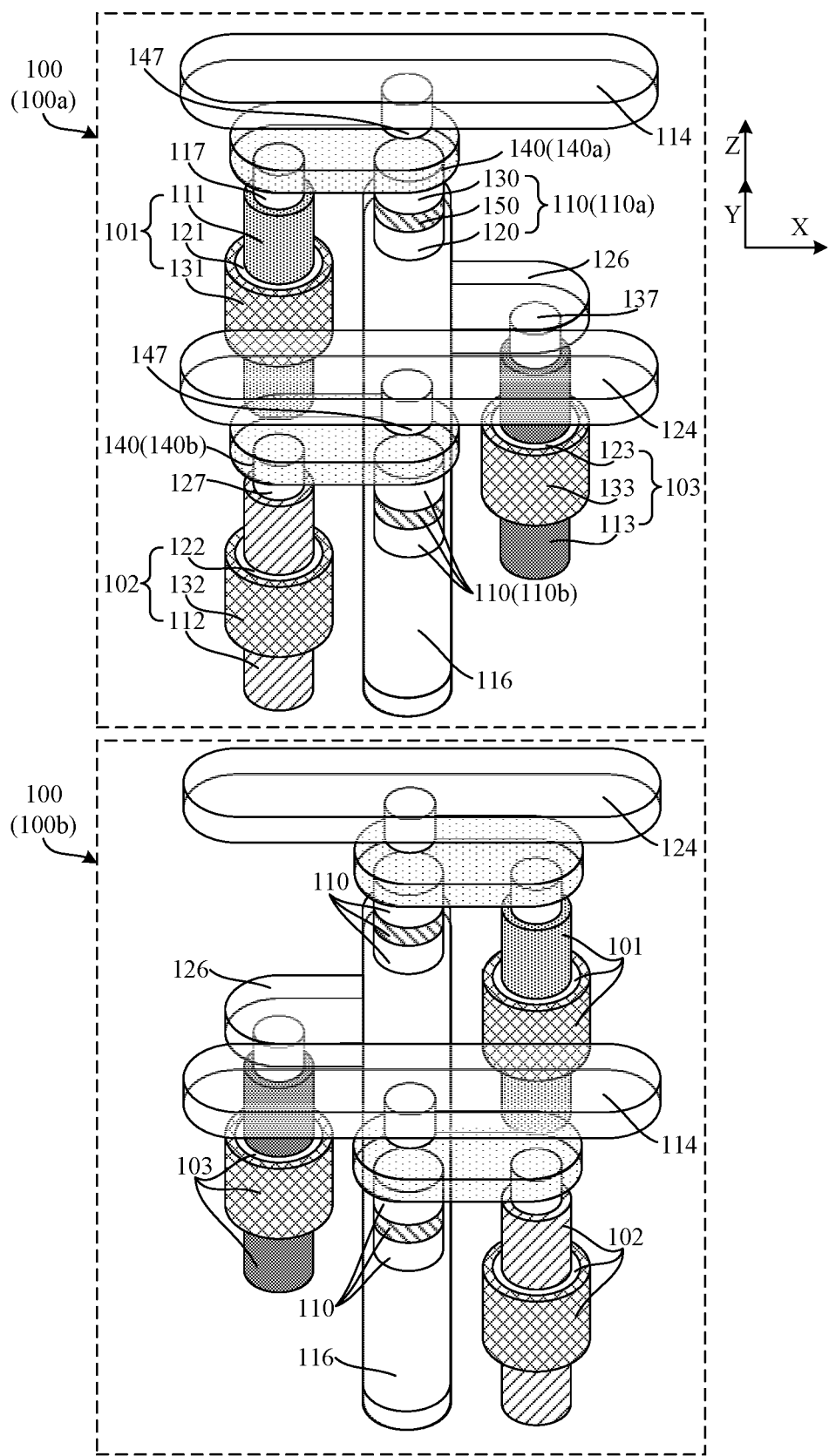
FIG. 1 is a schematic three-dimensional structural diagram of a magnetic storage structure according to an embodiment of the present disclosure.
Figure 2:
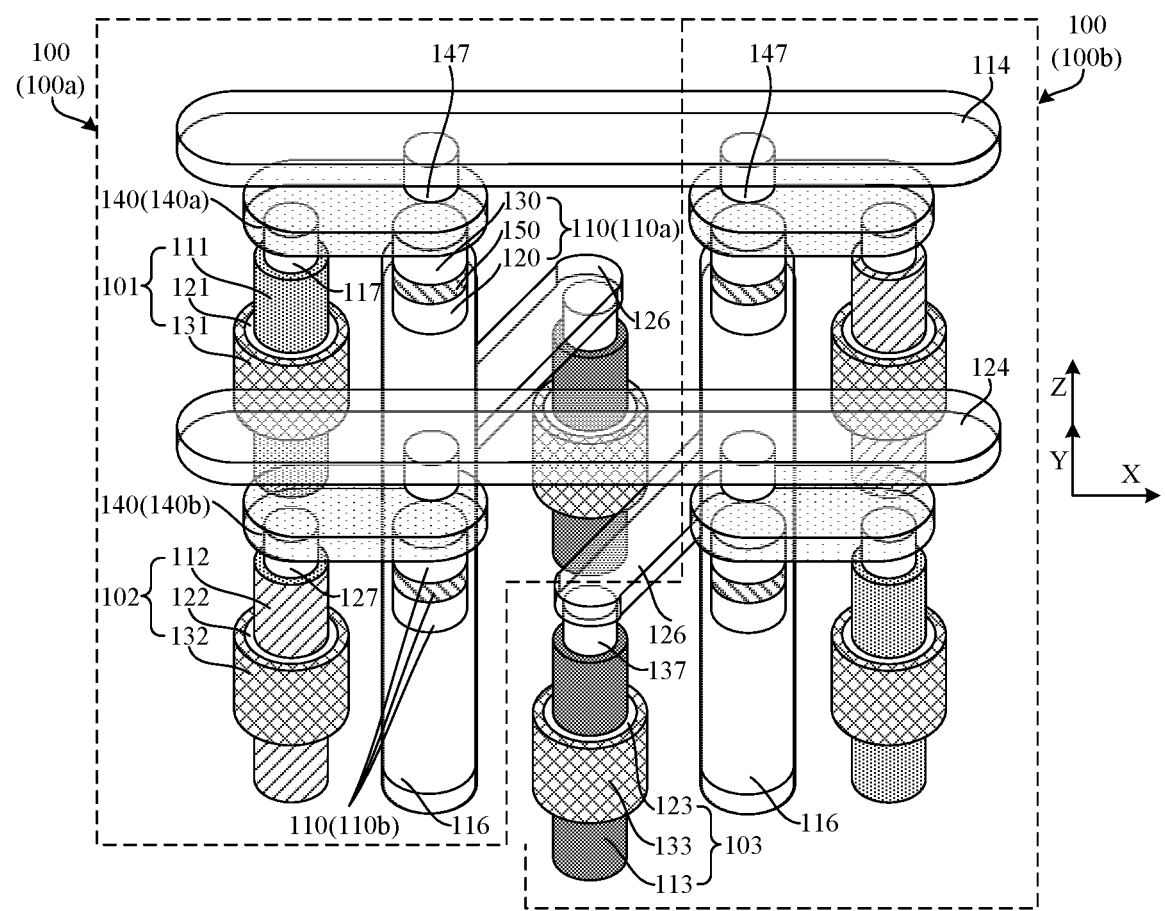
FIG. 2 is another schematic three-dimensional structural diagram of a magnetic storage structure according to an embodiment of the present disclosure.
Figure 3:
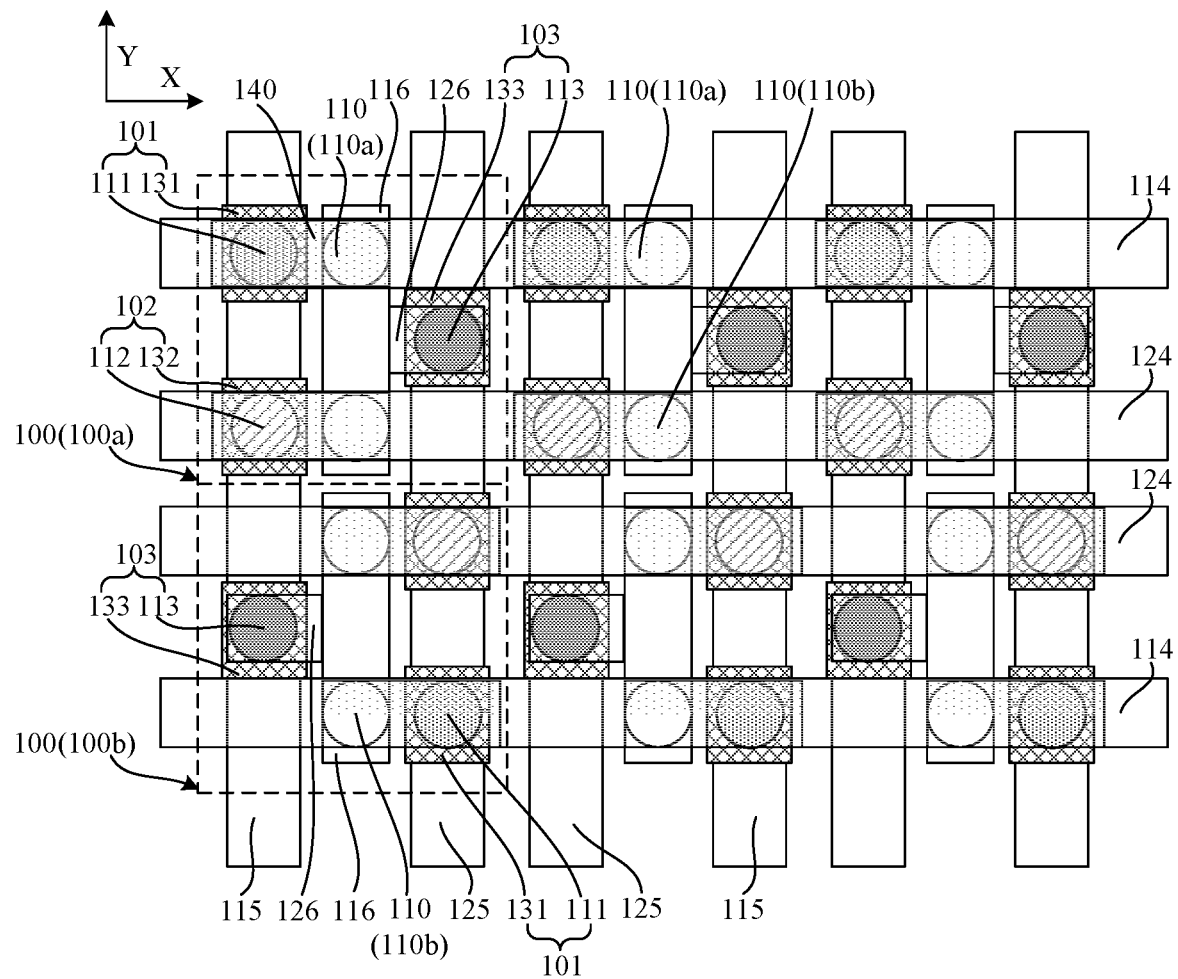
FIG. 3 is a schematic top-down view of the magnetic storage structure corresponding to FIG. 1.

An embodiment of the present disclosure provides a magnetic storage structure, and the magnetic storage structure provided by this embodiment of the present disclosure will be described in detail below with reference to the accompanying drawings. FIG. 1 is a schematic three-dimensional structural diagram of a magnetic storage structure according to an embodiment of the present disclosure; FIG. 2 is another schematic three-dimensional structural diagram of a magnetic storage structure according to an embodiment of the present disclosure; FIG. 3 is a schematic top-down view of the magnetic storage structure corresponding to FIG. 1; and FIG. 4 is another schematic top-down view of the magnetic storage structure corresponding to FIG. 2. It is to be noted that a plurality of magnetic storage structures are schematically illustrated in FIGS. 1 to 4.

Referring to FIGS. 1 to 4, a magnetic storage structure 100 includes: two magnetic tunnel junctions 110, where each of the two magnetic tunnel junctions 110 includes a fixed layer 120 and a free layer 130; spin-orbit coupling layers 140 in one-to-one correspondence with the two magnetic tunnel junctions 110, where each of the spin-orbit coupling layers 140 is positioned on a side of the free layer 130 away from the fixed layer 120; a first transistor 101 and a second transistor 102, where one of the spin-orbit coupling layers 140 is electrically connected to a source terminal or a drain terminal of the first transistor 101, other one of the spin-orbit coupling layers 140 is electrically connected to a source terminal or a drain terminal of the second transistor 102; and a third transistor 103, where a source terminal or a drain terminal of the third transistor 103 is electrically connected to the fixed layers 120 in the two magnetic tunnel junctions 110.

For a single magnetic storage structure 100, the first transistor 101, the second transistor 102 and the third transistor 103 share the two magnetic tunnel junctions 110. The read operation on the two magnetic tunnel junctions 110 is implemented by means of the third transistor 103, and the write operation on the two magnetic tunnel junctions 110 is implemented respectively by means of the first transistor 101 and the second transistor 102. The write operation and the read operation on the two magnetic tunnel junctions 110 are implemented by means of the three transistors on the whole. That is, storage and read of two-byte data are implemented by means of the three transistors and the two magnetic tunnel junctions 110, which is advantageous to reducing number of transistors needed to store and read the two-byte data, thereby increasing the layout density of the magnetic tunnel junctions 110 and the transistors in the magnetic storage structure 100, to increase the quantity of the data stored in unit space of the magnetic storage structure 100.

In some embodiments, with continued reference to FIG. 1 and FIG. 2, all of the first transistor 101, the second transistor 102 and the third transistor 103 are vertical gate-all-around (VGAA) transistor structures. In this way, it is advantageous to reducing the layout area of the transistors in a horizontal direction, i.e., on a plane perpendicular to a direction Z, such that word lines configured to control channel regions of the transistors and bit lines connected to the source terminals or the drain terminals of the transistors are arranged along the direction Z, which is advantageous to constituting the three-dimensional (3D) stacked magnetic storage structure 100, and thus is advantageous to increasing integration density of the magnetic storage structure 100.

The magnetic tunnel junction 110, the first transistor 101, the second transistor 102 and the third transistor 103 are described in detail below.

In some embodiments, referring to FIG. 1 and FIG. 2, the magnetic tunnel junction 110 includes the fixed layer 120, a tunneling layer 150 and the free layer 130 sequentially stacked along a direction where the magnetic tunnel junction 110 points to the spin-orbit coupling layer 140, i.e., along the direction Z. The fixed layer 120 and the free layer 130 are ferromagnetic layers, and coercivity of the free layer 130 is smaller than that of the fixed layer 120. The tunneling layer 150 is a non-magnetic insulating layer. It is to be understood that when the magnetic tunnel junction 110 is subjected to saturation magnetization, a magnetization direction of the fixed layer 120 and a magnetization direction of the free layer 130 are parallel to each other. When the magnetic tunnel junction 110 is subjected to reverse magnetization, the coercivity of the free layer 130 is smaller than that of the fixed layer 120. In this case, a magnetization vector of the free layer 130 having the smaller coercivity is first flipped over, such that the magnetization direction of the fixed layer 120 and the magnetization direction of the free layer 130 become antiparallel. In addition, a tunneling probability of electrons tunneling from one ferromagnetic layer to another ferromagnetic layer is related to the magnetization directions of the two ferromagnetic layers. When the magnetization direction of the fixed layer 120 and the magnetization direction of the free layer 130 are parallel to each other, the probability of the electrons tunneling in the fixed layer 120 and the free layer 130 is higher, such that the magnetic tunnel junction 110 is in a low-resistance state. When the magnetization direction of the fixed layer 120 is opposite to the magnetization direction of the free layer 130, the probability of the electrons tunneling in the fixed layer 120 and the free layer 130 is lower, such that the magnetic tunnel junction 110 is in a high-resistance state.

In some embodiments, a material of the free layer 130 and a material of the fixed layer 120 each include at least one of cobalt-iron-boron, cobalt, or ferronickel, and a material of the tunneling layer 150 may be magnesium oxide.

In some embodiments, a material of the spin-orbit coupling layer 140 may be at least one of platinum, tantalum, tungsten, iridium, gold, and titanium. It is to be understood that the spin-orbit coupling layer 140 is positioned on a side of the free layer 130 away from the fixed layer 120. The spin-orbit coupling layer 140 generates an exchange coupling field in the free layer 130 by means of an interlayer exchange coupling (IEC) effect. A spin current is injected into the free layer 130 via a spin-orbit interaction generated by the current flowing through the spin-orbit coupling layer 140 to rapidly flip a magnetic torque in the free layer 130, such that the free layer 130 and the tunneling layer 150 are not damaged. When a magnetic field direction of the free layer 130 is the same as that of the fixed layer 120, the magnetic tunnel junction 110 is in the low-resistance state. When the magnetic field direction of the free layer 130 is opposite to the magnetic field direction of the fixed layer 120, the magnetic tunnel junction 110 is in the high-resistance state. Thus, it may be determined whether the data stored in the magnetic tunnel junction 110 is "0" or "1" by detecting the high or low resistance of the magnetic tunnel junction 110.

In some embodiments, referring to FIG. 1 and FIG. 2, the first transistor 101 includes a first semiconductor channel 111 extending along the direction Z. The first semiconductor channel 111 is divided into three segments along the direction Z, where a segment of the first semiconductor channel 111 positioned in a middle serves as a first channel region of the first transistor 101, and two segments of the first semiconductor channel 111 positioned on two sides of the first channel region serve as a source terminal and a drain terminal of the first transistor 101, respectively. The first transistor 101 further includes a first gate dielectric layer 121 and a first gate 131 sequentially surrounding a side wall of the first channel region extending along the direction Z.

Similarly, the second transistor 102 includes a second semiconductor channel 112 extending along the direction Z, and the second semiconductor channel 112 is divided into three segments along the direction Z. A segment of the second semiconductor channel 112 positioned in a middle serves as a second channel region of the second transistor 102, and two segments of the second semiconductor channel 112 positioned on two sides of the second channel region serve as a source terminal and a drain terminal of the second transistor 102, respectively. The second transistor 102 further includes a second gate dielectric layer 122 and a second gate 132 sequentially surrounding a side wall of the second channel region extending along the direction Z.

Similarly, the third transistor 103 includes a third semiconductor channel 113 extending along the direction Z, and the third semiconductor channel 113 is divided into three segments along the direction Z. A segment of the third semiconductor channel 113 positioned in a middle serves as a third channel region of the third transistor 103, and two segments of the third semiconductor channel 113 positioned on two sides of the third channel region serve as a source terminal and a drain terminal of the third transistor 103, respectively. The third transistor 103 further includes a third gate dielectric layer 123 and a third gate 133 sequentially surrounding a side wall of the third channel region extending along the direction Z.

It is to be noted that for simplicity of the figures, the gate dielectric layers of the first transistor 101, of the second transistor 102 and of the third transistor 103 are not shown in FIG. 3 and FIG. 4. That is, the first gate dielectric layer 121, the second gate dielectric layer 122 and the third gate dielectric layer 123 are not shown. It is to be understood that in FIG. 3 and FIG. 4, the first transistor 101 is shown by the first semiconductor channel 111 and the first gate 131, the second transistor 102 is shown by the second semiconductor channel 112 and the second gate 132, and the third transistor 103 is shown by the third semiconductor channel 113 and the third gate 133.

In addition, the first semiconductor channel 111, the second semiconductor channel 112 and the third semiconductor channel 113 are respectively shown in three different filling modes in FIG. 1 to FIG. 4, to distinguish the first transistor 101 from the second transistor 102 and the third transistor 103. In practical applications, the first transistor 101, the second transistor 102, and the third transistor 103 have no difference in structure and thus may be formed simultaneously, but different functions are implemented in the magnetic storage structure 100. Moreover, to display a positional relationship between the structures in the magnetic storage structure 100, part of the structures are drawn perspectively in FIG. 1 to FIG. 4.

In some embodiments, referring to FIG. 3 and FIG. 4, every two of an arrangement direction of the first transistor 101 and the second transistor 102, an arrangement direction of the first transistor 101 and the third transistor 103, and an arrangement direction of the second transistor 102 and the third transistor 103 intersect with each other.

In one example, referring to FIG. 3, for the single magnetic storage structure 100, every two of a connecting line between the first transistor 101 and the second transistor 102, a connecting line between the first transistor 101 and the third transistor 103, and a connecting line between the second transistor 102 and the third transistor 103 intersect with each other, and the three connecting lines constitute an acute triangle. It is to be understood that the first transistor 101, the second transistor 102, and the third transistor 103 serve as individual transistors. When the plurality of magnetic storage structures 100 arranged according to a preset rule are included, a plurality of individual transistors are arranged in a parallelogram array. The arrangement of the plurality of individual transistors is described in detail in a second embodiment of the present disclosure subsequently.

In another example, referring to FIG. 4, the first transistor 101 and the third transistor 103 are arranged along a first direction X, and the first transistor 101 and the second transistor 102 are arranged along a second direction Y, where the first direction X is perpendicular to the second direction Y. In this way, for the single magnetic storage structure 100, every two of the connecting line between the first transistor 101 and the second transistor 102, the connecting line between the first transistor 101 and the third transistor 103, and the connecting line between the second transistor 102 and the third transistor 103 intersect with each other, and the three connecting lines constitute a right triangle. It is to be understood that the first transistor 101, the second transistor 102, and the third transistor 103 serve as individual transistors. When the plurality of magnetic storage structures 100 arranged according to the preset rule are included, a plurality of individual transistors are arranged in a rectangular array. The arrangement of the plurality of individual transistors is described in detail in the second embodiment of the present disclosure subsequently.

In some embodiments, referring to FIG. 1 to FIG. 4, the magnetic tunnel junction 110 electrically connected to the first transistor 101 and the first transistor 101 are arranged at intervals along the first direction X, and the magnetic tunnel junction 110 electrically connected to the second transistor 102 and the second transistor 102 are arranged at intervals along the first direction X. In one example, the spin-orbit coupling layers 140 also extend along the first direction X and are in one-to-one correspondence with the magnetic tunnel junctions 110. The spin-orbit coupling layer 140 is electrically connected to the free layer 130 and the first semiconductor channel 111 of the first transistor 101 simultaneously to achieve the electrical connection between the first transistor 101 and the magnetic tunnel junction 110; or, the spin-orbit coupling layer 140 is electrically connected to the free layer 130 and the second semiconductor channel 112 of the second transistor 102 simultaneously to achieve the electrical connection between the second transistor 102 and the magnetic tunnel junction 110.

In some embodiments, referring to FIGS. 1 to 4, the magnetic tunnel junction 110 is positioned between the first transistor 101 and the third transistor 103. In one example, the first transistor 101 and the second transistor 102 are arranged in an array along the second direction Y. Along the first direction X, the first transistor 101, the magnetic tunnel junction 110 and the third transistor 103 are sequentially arranged at intervals, such that the magnetic tunnel junction 110 is positioned between the first transistor 101 and the third transistor 103. It is to be understood that, when two free layers 130 of the two magnetic tunnel junctions 110 need to be electrically connected to the first transistor 101 and the second transistor 102 respectively, and two fixed layers 120 of the two magnetic tunnel junctions 110 need to be electrically connected to the third transistor 103, the magnetic tunnel junction 110 is positioned between the first transistor 101 and the third transistor 103, which is advantageous to reducing a wiring length of a wiring layer provided in the magnetic storage structure 100. In some embodiments, a pitch between the magnetic tunnel junction 110 and the first transistor 101, a pitch between the magnetic tunnel junction 110 and the second transistor 102, and a pitch between the magnetic tunnel junction 110 and the third transistor 103 are shorter, this is advantageous to reducing the wiring length of the wiring layer (i.e., the spin-orbit coupling layer 140) implementing the electrical connection between the magnetic tunnel junction 110 and the first transistor 101 or second transistor 102, and to reducing the wiring length of the wiring layer implementing the electrical connection between the magnetic tunnel junction 110 and the third transistor 103. In one example, the two magnetic tunnel junctions may be arranged at intervals along the second direction Y.

In some embodiments, referring to FIG. 1 and FIG. 2, the magnetic storage structure may further include: a first conductive pillar 117 positioned between the first transistor 101 and the spin-orbit coupling layer 140, where the first conductive pillar 117 is in contact connection with the first semiconductor channel 111 in the first transistor 101 and the spin-orbit coupling layer 140, respectively; and a second conductive pillar 127 positioned between the second transistor 102 and the spin-orbit coupling layer 140, where the second conductive pillar 127 is in contact connection with the second semiconductor channel 112 in the second transistor 102 and the spin-orbit coupling layer 140, respectively. It is to be noted that in practical applications, the first semiconductor channel 111 in the first transistor 101 may be in direct contact connection with the spin-orbit coupling layer 140, and the second semiconductor channel 112 in the second transistor 102 may also be in direct contact connection with the spin-orbit coupling layer 140.

In some embodiments, the electrical connection between the two magnetic tunnel junctions 110 and the third transistor 103 is achieved as follows. Referring to FIGS. 1 to 4, the magnetic storage structure may further include a first electrical connection layer 116 in contact connection with the fixed layers 120 of the two magnetic tunnel junctions 110; and a second electrical connection layer 126, where one end of the second electrical connection layer 126 is in contact connection with the first electrical connection layer 116, and other end of the second electrical connection layer 126 is in contact connection with the source terminal or the drain terminal of the third transistor 103.

In some embodiments, the magnetic storage structure may further include a third conductive pillar 137 positioned between the third transistor 103 and the second electrical connection layer 126, where the third conductive pillar 137 is in contact connection with the third semiconductor channel 113 in the third transistor 103 and the second electrical connection layer 126, respectively. It is to be noted that in practical applications, the third semiconductor channel 113 in the third transistor 103 may be in direct contact connection with the second electrical connection layer 126.

In conclusion, for a single magnetic storage structure 100, the first transistor 101, the second transistor 102 and the third transistor 103 share the two magnetic tunnel junctions 110. The read operation on the two magnetic tunnel junctions 110 is implemented by means of the third transistor 103, and the write operation on the two magnetic tunnel junctions 110 is implemented respectively by means of the first transistor 101 and the second transistor 102. The write operation and the read operation on the two magnetic tunnel junctions 110 are implemented by means of the three transistors on the whole. That is, storage and read of two-byte data are implemented by means of the three transistors and the two magnetic tunnel junctions 110, which is advantageous to reducing number of transistors needed to store and read the two-byte data, thereby increasing the layout density of the magnetic tunnel junctions 110 and the transistors in the magnetic storage structure 100, to increase the quantity of the data stored in unit space of the magnetic storage structure 100.

Another embodiment of the present disclosure also provides a magnetic storage array structure, which includes a plurality of magnetic storage structures 100 as described in an embodiment of the present disclosure. The magnetic storage array structure provided by another embodiment of the present disclosure will be described in detail below with reference to FIGS. 1 to 4. It is to be noted that the parts the same as or corresponding to the foregoing embodiment are not described here.

Referring to FIG. 3 and FIG. 4, the magnetic storage array structure includes magnetic storage structures 100, where at least two magnetic storage structures 100 are arranged at intervals along the first direction X; and at least two magnetic storage structures 100 are arranged at intervals along the second direction Y.

Arrangement of the plurality of magnetic storage structures 100 will be described in detail below through two embodiments.

In some embodiments, referring to FIG. 1 and FIG. 3, two adjacent magnetic storage structures 100 along the second direction Y are centrosymmetric, and the third transistor 103 of one of the two magnetic storage structures 100 and the first transistor 101 of other one of the two magnetic storage structures 100 are arranged at an interval along the second direction Y. It is to be understood that for the two adjacent magnetic storage structures 100 along the second direction Y, the four magnetic tunnel junctions 110 are arranged at intervals along the second direction Y, the third transistor 103 of one of the two magnetic storage structures 100 and the first transistor 101 of other one of the two magnetic storage structures 100 directly face each other along the second direction Y, and the second transistor 102 of one of the two magnetic storage structures 100 and the third transistor 103 of other one of the two magnetic storage structures 100 directly face each other along the second direction Y. Thus, it is advantageous to respectively arranging the three transistors, which are respectively the first transistor 101, the second transistor 102 and the third transistor 103, on the two sides of the magnetic tunnel junction 110 along the first direction X, thereby it is advantageous to reducing the layout space of the two adjacent magnetic storage structures 100 along the second direction Y in the magnetic storage array structure, to increase the integration density of the magnetic storage structures 100 in the magnetic storage array structure.

In addition, in the magnetic storage array structure shown in FIG. 1 and FIG. 3, the first transistor 101, the second transistor 102 and the third transistor 103 serve as individual transistors, and the individual transistors are arranged in the parallelogram array, such that the magnetic storage structures 100 may be arranged in order, which not only facilitates fabrication of the magnetic storage array structure, but also facilitates unified control of the plurality of magnetic storage structures 100 subsequently, and also a form of hexagonal closest packing is implemented. Moreover, the two adjacent magnetic storage structures 100 along the second direction Y may serve as a whole, i.e., a partial structure as shown in FIG. 1. In the magnetic storage array structure, the above two magnetic storage structures 100 as a whole are arranged at intervals along the first direction X and the second direction Y, which is advantageous to further increasing the integration density of the magnetic storage structures 100 in the magnetic storage array structure.

In some other embodiments, referring to FIG. 2 and FIG. 4, the two adjacent magnetic storage structures 100 along the first direction X are centrosymmetric, and the third transistor 103 of one of the two magnetic storage structures 100 and the third transistor 103 of other one of the two magnetic storage structures 100 are arranged at an interval along the second direction Y. It is to be understood that, for the two adjacent magnetic storage structures 100 along the first direction X, two third transistors 103 are arranged at intervals along the second direction Y, the first transistor 101 of one of the two magnetic storage structures 100 and the second transistor 102 of the other one of the two magnetic storage structures 100 directly face each other along the first direction X, the second transistor 102 of the one of the two magnetic storage structures 100 and the first transistor 101 of the other one of the two magnetic storage structures 100 directly face each other along the first direction X, and the magnetic tunnel junctions 110 of the two magnetic storage structures 100 also directly face each other along the first direction X. In this way, it is advantageous to respectively arranging two transistors on the two sides of the magnetic tunnel junction 110 along the first direction X, and thus it is advantageous to reducing the layout space of the two adjacent magnetic storage structures 100 along the first direction X in the magnetic storage array structure, to increase the integration density of the magnetic storage structures 100 in the magnetic storage array structure.

In addition, in the magnetic storage array structure shown in FIG. 2 and FIG. 4, the first transistor 101, the second transistor 102 and the third transistor 103 serve as individual transistors, and the individual transistors are arranged in the rectangular array, such that the magnetic storage structures 100 may be arranged in order, which not only facilitates fabrication of the magnetic storage array structure, but also facilitates unified control of the plurality of magnetic storage structures 100 subsequently, and also a form of tetragonal closest packing is implemented. Moreover, the two adjacent magnetic storage structures 100 along the first direction X may serve as a whole, i.e., a partial structure as shown in FIG. 2. In the magnetic storage array structure, the above two magnetic storage structures 100 as a whole are arranged at intervals along the first direction X and the second direction Y, which is advantageous to further increasing the integration density of the magnetic storage structures 100 in the magnetic storage array structure.

In the above embodiment, referring to FIGS. 1 to 4, the magnetic storage array structure may further include a first signal line 114 and a second signal line 124 extending along the first direction X, where the magnetic storage structures 100 arranged along the first direction X are electrically connected to the same first signal line 114 and are electrically connected to the same second signal line 124.

In one example, referring to FIG. 3, the spin-orbit coupling layers 140 corresponding to the first transistors 101 arranged along the first direction X are all electrically connected to the same first signal line 114, and the spin-orbit coupling layers 140 corresponding to the second transistors 102 arranged along the first direction X are all electrically connected to the same second signal line 124. In another example, referring to FIG. 4, the first transistors 101 and the second transistors 102 are arranged in a staggered manner along the first direction X, and the first transistors 101 and the second transistors 102 arranged in a staggered manner along the first direction X are both electrically connected to the same first signal line 114 or the same second signal line 124.

It is to be understood that the plurality of magnetic storage structures 100 arranged along the first direction X may share one first signal line 114 and one second signal line 124, which is advantageous to reducing control ports of the first signal line 114 and the second signal line 124, thereby improving capability of control of the magnetic storage array.

It is to be noted that referring to FIG. 1 and FIG. 2, the magnetic storage array structure further includes a fourth conductive pillar 147, where the fourth conductive pillar 147 is positioned between the spin-orbit coupling layer 140 and the first signal line 114 to implement the electrical connection between the spin-orbit coupling layer 140 and the first signal line 114; or the fourth conductive pillar 147 is positioned between the spin-orbit coupling layer 140 and the second signal line 124 to implement the electrical connection between the spin-orbit coupling layer 140 and the second signal line 124.

Referring to FIG. 3 and FIG. 4, the magnetic storage array structure may further include a first control line 115 and a second control line 125 extending along the second direction Y, and the magnetic storage structures 100 arranged along the second direction Y are electrically connected to the same first control line 115 and are electrically connected to the same second control line 125.

In one example, referring to FIG. 3, the transistors positioned on a side of the magnetic tunnel junction 110 are respectively the first transistor 101, the second transistor 102, and the third transistor 103 arranged in sequence, which are alternately arranged along the second direction Y in the same sequence. The transistors positioned on other side of the magnetic tunnel junction 110 are respectively the third transistor 103, the second transistor 102, and the first transistor 101 arranged in sequence, which are alternately arranged along the second direction Y in the same sequence. Gates of the plurality of transistors, which are respectively the first transistor 101, the second transistor 102 and the third transistor 103 arranged in sequence and are alternately arranged along the second direction Y, are all electrically connected to the first control line 115; and the gates of the plurality of transistors, which are respectively the third transistor 103, the second transistor 102 and the first transistor 101 arranged in sequence and are alternately arranged along the second direction Y, are all electrically connected to the second control line 125.

In another example, referring to FIG. 4, the first transistors 101 and the second transistors 102 arranged alternately along the second direction Y are all electrically connected to the same first control line 115, and the third transistors 103 arranged at intervals along the second direction Y are all electrically connected to the same second control line 125. In this way, two third transistors 103 of the two magnetic storage structures 100 which are adjacent and centrosymmetric in the first direction X can share the second control line 125, which is advantageous to further reducing the control ports of the second control line 125 and improving the capability of control of the magnetic storage array.

In addition, in the examples shown in FIG. 3 and FIG. 4, the plurality of magnetic storage structures 100 arranged along the second direction Y can share a first control line 115 and a second control line 125, which is advantageous to reducing the control ports of the first control line 115 and the second control line 125 and improving the capability of control of the magnetic storage array.

It is to be noted that for clarity of illustration, the first control line 115 and the second control line 125 are not schematically shown in FIG. 1 and FIG. 2. Referring to FIG. 3 and FIG. 4, the first control line 115 is in contact connection with a plurality of gates arranged along the second direction Y, and the second control line 125 is also in contact connection with a plurality of gates arranged along the second direction Y.

In some embodiments, referring to FIGS. 1 to 4, the magnetic tunnel junction 110 electrically connected to the first transistor 101 is a first magnetic tunnel junction 110a, and the magnetic tunnel junction 110 electrically connected to the second transistor 102 is a second magnetic tunnel junction 110b. The first magnetic tunnel junctions 110a in the magnetic storage structures 100 arranged along the first direction X are electrically connected to the same first signal line 114; and the second magnetic tunnel junctions 110b in the magnetic storage structures 100 arranged along the first direction X are electrically connected to the same second signal line 124. It is to be understood that the first signal line 114 is configured to perform the write operation or read operation on the first magnetic tunnel junction 110a, and the second signal line 124 is configured to perform the write operation or read operation on the second magnetic tunnel junction 110b.

In some embodiments, referring to FIG. 1 and FIG. 3, the two adjacent magnetic storage structures 100 along the second direction Y are a first magnetic storage structure 100a and a second magnetic storage structure 100b, respectively. The same first control line 115 is electrically connected to the first transistor 101 and the second transistor 102 in the first magnetic storage structure 100a and to the third transistor 103 in the second magnetic storage structure 100b, to control the three transistors to be in an on state or an off state. The same second control line 125 is electrically connected to the first transistor 101 and the second transistor 102 in the second magnetic storage structure 100b and to the third transistor 103 in the first magnetic storage structure 100a, to control the three transistors to be in the on state or the off state.

In some other embodiments, referring to FIG. 2 and FIG. 4, the same first control line 115 is electrically connected to the first transistor 101 and the second transistor 102 in the magnetic storage structure 100 arranged along the second direction Y, to control the first transistor 101 and the second transistor 102 to be in the on state or the off state. The two adjacent magnetic storage structures 100 along the first direction X are respectively the first magnetic storage structure 100a and the second magnetic storage structure 100b. The same second control line 125 is electrically connected to the third transistor 103 in the first magnetic storage structure 100a and the third transistor 103 in the second magnetic storage structure 100b, to control the third transistor 103 to be in the on state or the off state.

In some embodiments, the magnetic storage array structure may further include a first electrical connection layer 116 in contact connection with the fixed layers 120 of the plurality of magnetic tunnel junctions 110 arranged along the second direction Y; and a second electrical connection layer 126, where one end of the second electrical connection layer 126 is in contact connection with the first electrical connection layer 116, and other end of the second electrical connection layer 126 is in contact connection with the source terminal or the drain terminal of the third transistor 103.

It is to be noted that in FIGS. 1 to 4, it is exemplified that the first electrical connection layers 116 are in one-to-one correspondence with the magnetic storage structures 100. In practical applications, the first electrical connection layers 116 may extend along the second direction Y, and one first electrical connection layer 116 may correspond to the plurality of magnetic storage structures 100 arranged along the second direction Y. That is, the plurality of magnetic storage structures 100 arranged along the second direction Y may share one first electrical connection layer 116.

Principles of performing the read operation and the write operation on the magnetic storage structure 100 are described in detail below with reference to FIG. 1 to FIG. 4.

For the first magnetic storage structure 100a, the first gate 131 of the first transistor 101 and the second gate 132 of the second transistor 102 are connected to the first control line 115, such that the first control line 115 controls turn-on or turn-off of the first transistor 101 and the second transistor 102. The third gate 133 of the third transistor 103 is connected to the second control line 125, such that the second control line 125 controls turn-on or turn-off of the third transistor 103. The source terminal or drain terminal of the first transistor 101 is electrically connected to the spin-orbit coupling layer 140 corresponding to the first magnetic tunnel junction 110a, and the first magnetic tunnel junction 110a corresponds to the first signal line 114. The source terminal or drain terminal of the second transistor 102 is electrically connected to the spin-orbit coupling layer 140 corresponding to the second magnetic tunnel junction 110b, and the second magnetic tunnel junction 110b corresponds to the second signal line 124. Thus, writing to the first magnetic tunnel junction 110a may be controlled by means of the first transistor 101 and the first signal line 114, writing to the second magnetic tunnel junction 110b may be controlled by means of the second transistor 102 and the second signal line 124, reading from the first magnetic tunnel junction 110a may be controlled by means of the third transistor 103 and the first signal line 114, and reading from the second magnetic tunnel junction 110b may be controlled by means of the third transistor 103 and the second signal line 124. In this way, read/write paths may be distinguished, to facilitate separate optimization of reading and writing.

In some embodiments, the magnetization structure direction of the magnetic tunnel junction 110 is perpendicular to the surface of the spin-orbit coupling layer 140, and the free layer 130 is positioned on the surface of the spin-orbit coupling layer 140. In some other embodiments, the magnetization structure direction of the magnetic tunnel junction 110 is parallel to the surface of the spin-orbit coupling layer 140, and the free layer 130 is positioned on the surface of the spin-orbit coupling layer 140.

For example, when the magnetization structure direction of the magnetic tunnel junction 110 is perpendicular to the surface of the spin-orbit coupling layer 140, the magnetic field direction of the free layer 130 may be converted into the direction perpendicular to and close to the surface of the spin-orbit coupling layer 140, or converted into the direction perpendicular to and away from the surface of the spin-orbit coupling layer 140. The magnetic field direction of the fixed layer 120 may be fixed to be the direction perpendicular to and away from the surface of the spin-orbit coupling layer 140, or fixed to be the direction perpendicular to and close to the surface of the spin-orbit coupling layer 140. When the magnetic field direction of the free layer 130 is converted by the spin-orbit interaction of the spin-orbit coupling layer 140, the magnetic field direction of the free layer 130 is converted to be the same as the magnetic field direction of the fixed layer 120. In this case, the magnetic tunnel junction 110 is in the low-resistance state. When the magnetic field direction of the free layer 130 is converted to be opposite to the magnetic field direction of the fixed layer 120, the magnetic tunnel junction 110 is in the high-resistance state. In addition, the magnetization structure direction of the magnetic tunnel junction 110 may also be parallel to the surface of the spin-orbit coupling layer 140. That is, the magnetic field direction of the fixed layer 120 of the magnetic tunnel junction 110 is parallel to the surface of the spin-orbit coupling layer 140. The magnetic field direction of the free layer 130 may be the same as or opposite to the magnetic field direction of the fixed layer 120. Correspondingly, the magnetic field directions of the free layer 130 and the fixed layer 120 determine the resistance state of the magnetic tunnel junction 110. It is to be understood that the magnetization structure direction of the magnetic tunnel junction 110 may be selected according to actual situations. In this embodiment, the magnetization structure direction of the magnetic tunnel junction 110 is not overdefined.

In conclusion, the quantity of data stored in the unit space of the magnetic storage structure 100 in the magnetic storage array structure is higher, and the number of transistors needed to store and read the two-byte data can be reduced. Thus, it is advantageous to increasing the quantity of the data stored in the unit space of the magnetic storage array structure and reducing the number of the transistors needed to store and read data of a certain dimension. In addition, the arrangement of the magnetic storage structures 100 in the magnetic storage array structure shown in FIG. 3 or FIG. 4 is used, which is advantageous to increasing the integration density of the magnetic storage structures 100 in the magnetic storage array structure and reducing the number of the first signal lines 114, the second signal lines 124, the first control lines 115 and the second control lines 125 needed, to reduce the control ports of the first signal lines 114, the second signal lines 124, the first control lines 115 and the second control lines 125, thereby improving the capability of control of the magnetic storage array.

Another embodiment of the present disclosure further provides a memory. The array structure of the memory is arranged on the basis of the magnetic storage array structure described in another embodiment of the present disclosure. It is to be noted that the parts the same as or corresponding to the foregoing embodiment are not described here.

It is to be understood that the array structure of the memory is arranged on the basis of the magnetic storage array structure described in another embodiment of the present disclosure. In this way, it is advantageous to increasing the quantity of data stored in the unit space of the memory, improving the capability of control of the memory to the magnetic storage array, and increasing the integration density of the magnetic storage array structures in the memory.

In some embodiments, the memory may be a memory cell or device based on a semiconductor device or component. For example, the memory may be a volatile memory such as a dynamic random access memory (DRAM), or may be a non-volatile memory such as a phase change random access memory (PRAM), a magnetic random access memory (MRAM), or a resistive random access memory (RRAM).

Yet another embodiment of the present disclosure also provides a read-write control method for a magnetic storage array structure. The control method is configured for controlling the magnetic storage array structure provided by the preceding embodiment or the magnetic storage structure in the magnetic storage array structure. The read-write control method for the magnetic storage array structure provided by yet another embodiment of the present disclosure will be described in detail below with reference to FIGS. 1 to 5. It is to be noted that the parts the same as or corresponding to the foregoing embodiment are not described here.

FIG. 5 is a flowchart of a read-write control method for a magnetic storage array structure provided by another embodiment of the present disclosure.

Referring to FIG. 5, the read-write control method for the magnetic storage array structure includes following steps.

S101: controlling one of the first transistor 101 and the second transistor 102 to be in the on state; controlling a current flowing through the spin-orbit coupling layer 140 to set a state of one of the two magnetic tunnel junctions 110 to be a high-resistance state or a low-resistance state, to implement a write operation on the magnetic tunnel junction 110, where the magnetic tunnel junction 110 subjected to the write operation corresponds to the first transistor 101 in the on state or the second transistor 102 in the on state.

S101: controlling the third transistor 103 to be in an on state, and reading a magnitude of the current flowing through one of the two magnetic tunnel junctions 110 to determine whether the magnetic tunnel junction 110 is in the high-resistance state or the low-resistance state, to implement a read operation on the magnetic tunnel junction.

In some embodiments, the magnetic tunnel junction 110 electrically connected to the first transistor 101 is the first magnetic tunnel junction 110*a*, and the spin-orbit coupling layer 140 corresponding to the first magnetic tunnel junction 110*a* is a first spin-orbit coupling layer 140*a*. The magnetic tunnel junction 110 electrically connected to the second transistor 102 is the second magnetic tunnel junction 110*b*, and the spin-orbit coupling layer 140 corresponding to the second magnetic tunnel junction 110*b* is a second spin-orbit coupling layer 140*b*.

Thus, the step of implementing the read operation and the write operation may include: with reference to FIGS. 1 to 4, controlling the current flowing through the first spin-orbit coupling layer 140*a* through the first signal line 114 to set the state of the first magnetic tunnel junction 110*a* to be the high-resistance state or the low-resistance state; controlling the current flowing through the second spin-orbit coupling layer 140*b* through the second signal line 124 to set the state of the second magnetic tunnel junction 110*b* to the high-resistance state or the low-resistance state; and controlling the first transistor 101, the second transistor 102 and the third transistor 103 to be turned on or off through the first control line 115 and the second control line 125.

In some embodiments, with reference to FIG. 1 and FIG. 3, the step of controlling part of the magnetic storage structures 100 to be subjected to the write operation may include following two manners.

In some embodiments, the first signal line 114 and the first control line 115 are gated to turn on the first transistor 101, and the current flowing through the first spin-orbit coupling layer 140*a* is controlled to set the state of the first magnetic tunnel junction 110*a* to be the high-resistance state or the low-resistance state, to implement the write operation on the first magnetic tunnel junction 110*a*.

In one example, when it is required to perform the write operation on the first magnetic tunnel junction 110*a* in the first magnetic storage structure 100*a*, a break-over voltage is applied to the first control line 115 corresponding to the first magnetic storage structure 100*a*, i.e., the first control line 115 is gated to turn on the first transistor 101. Next, a voltage is applied to the first signal line 114, i.e., the first signal line 114 is gated, such that the current flows through the first signal line 114, the first spin-orbit coupling layer 140*a*, and the first transistor 101. It is to be understood that a positive write voltage or a negative write voltage is introduced into the first signal line 114 to cause the current flowing through the first spin-orbit coupling layer 140*a* to generate the spin-orbit interaction, thereby injecting a spin current into the free layer 130 and rapidly flipping the magnetic moment of the free layer 130, such that the first magnetic tunnel junction 110*a* is in the high-resistance state or the low-resistance state.

In some other embodiments, the second signal line 124 and the first control line 115 are gated to turn on the second transistor 102, and the current flowing through the second spin-orbit coupling layer 140*b* is controlled to set the state of the second magnetic tunnel junction 110*b* to be the high-resistance state or the low-resistance state to implement the write operation on the second magnetic tunnel junction 110*b*.

In one example, when it is required to perform the write operation on the second magnetic tunnel junction 110*b* in the first magnetic storage structure 100*a*, a break-over voltage is applied to the first control line 115 corresponding to the second magnetic tunnel junction 110*b*, i.e., the first control line 115 is gated to turn on the second transistor 102. Next, a voltage is applied to the second signal line 124, i.e., the second signal line 124 is gated, such that the current flows through the second signal line 124, the second spin-orbit coupling layer 140*b*, and the second transistor 102. It is to be understood that a positive write voltage or a negative write voltage is introduced into the second signal line 124 to cause the current flowing through the second spin-orbit coupling layer 140*b* to generate the spin-orbit interaction, thereby injecting a spin current into the free layer 130 and rapidly flipping the magnetic moment of the free layer 130, such that the second magnetic tunnel junction 110*b* is in the high-resistance state or the low-resistance state.

In some embodiments, the step of controlling part of the magnetic storage structures 100 to be subjected to the read operation may include following two manners.

In some embodiments, the first signal line 114 and the second control line 125 are gated to turn on the third transistor 103, and a magnitude of the current flowing through the first magnetic tunnel junction 110*a* is read to determine whether the first magnetic tunnel junction 110*a* is in the high-resistance state or the low-resistance state, to implement the read operation on the first magnetic tunnel junction 110*a*.

In one example, when it is required to read the data stored in the first magnetic tunnel junction 110*a* in the first magnetic storage structure 100*a*, a break-over voltage is applied to the second control line 125 corresponding to the first magnetic storage structure 100*a*, i.e., the second control line 125 is gated to turn on the third transistor 103. Next, the first signal line 114 is gated, such that the current may flow through the first signal line 114, the first magnetic tunnel junction 110*a*, the first electrical connection layer 116, the second electrical connection layer 126, and the third transistor 103. In this way, the resistance of the first magnetic tunnel junction 110a may be detected through the first signal line 114 and an end of the third transistor 103 far away from the second electrical connection layer 126. The stored data is "1" when the first magnetic tunnel junction 110a is in the high-resistance state; and the stored data is "0" when the first magnetic tunnel junction 110a is in the low-resistance state.

In some other embodiments, the step of controlling part of the magnetic storage structures 100 to be subjected to the read operation may include: gating the second signal line 124 and the second control line 125 to turn on the third transistor 103, and reading a magnitude of the current flowing through the second magnetic tunnel junction 110b to determine whether the second magnetic tunnel junction 110b is in the high-resistance state or the low-resistance state, to implement the read operation on the second magnetic tunnel junction 110b.

In one example, when it is required to read the data stored in the second magnetic tunnel junction 110b in the second magnetic storage structure 100b, a break-over voltage is applied to the second control line 125 corresponding to the second magnetic storage structure 100b, i.e., the second control line 125 is gated to turn on the third transistor 103. Next, the second signal line 124 is gated, such that the current may flow through the second signal line 124, the second magnetic tunnel junction 110b, the first electrical connection layer 116, the second electrical connection layer 126, and the third transistor 103. In this way, the resistance of the second magnetic tunnel junction 110b may be detected through the second signal line 124 and an end of the third transistor 103 far away from the second electrical connection layer 126. The stored data is "1" when the second magnetic tunnel junction 110b is in the high-resistance state; and the stored data is "0" when the second magnetic tunnel junction 110b is in the low-resistance state.

In conclusion, in the read-write control method for the magnetic storage array structure provided by yet another embodiment of the present disclosure, storage and read of two-byte data may be implemented by means of the three transistors and the two magnetic tunnel junctions 110, which is advantageous to increasing the quantity of the data stored in the unit space of the magnetic storage structure 100 and/or magnetic storage array structure, and to reducing the number of the transistors needed to store and read data of a certain dimension. Furthermore, it is advantageous to reducing the number of the first signal lines 114, the second signal lines 124, the first control lines 115 and the second control lines 125 needed, to reduce the control ports of the first signal lines 114, the second signal lines 124, the first control lines 115 and the second control lines 125, thereby reducing complexity of read-write control of the magnetic storage array structure.

Those of ordinary skill in the art can understand that the above-mentioned embodiments are some embodiments for implementing the present disclosure, but in practical applications, various changes may be made to them in form and details without departing from the spirit and scope of the embodiments of the present disclosure. Any person skilled in the art can make their own changes and modifications without departing from the spirit and scope of the embodiments of the present disclosure. Therefore, the protection scope of the embodiments of the present disclosure shall be subject to the scope defined by the claims.

What is claimed is:

1. A magnetic storage structure, comprising:
two magnetic tunnel junctions, each of the two magnetic tunnel junctions comprising a fixed layer and a free layer;
spin-orbit coupling layers in one-to-one correspondence with the two magnetic tunnel junctions, each of the spin-orbit coupling layers being positioned on a side of the free layer away from the fixed layer;
a first transistor and a second transistor, one of the spin-orbit coupling layers being electrically connected to a source terminal or a drain terminal of the first transistor, other one of the spin-orbit coupling layers being electrically connected to a source terminal or a drain terminal of the second transistor; and
a third transistor, a source terminal or a drain terminal of the third transistor being electrically connected to the fixed layers in the two magnetic tunnel junctions, wherein every two of an arrangement direction of the first transistor and the second transistor, an arrangement direction of the first transistor and the third transistor, and an arrangement direction of the second transistor and the third transistor intersect with each other.

2. The magnetic storage structure according to claim 1, wherein all the first transistor, the second transistor, and the third transistor are vertical gate-all-around transistor structures.

3. The magnetic storage structure according to claim 1, wherein the first transistor and the third transistor are arranged along a first direction, the first transistor and the second transistor being arranged along a second direction, and the first direction and the second direction being perpendicular to each other.

4. The magnetic storage structure according to claim 1, wherein one of the two magnetic tunnel junctions electrically connected to the first transistor and the first transistor are arranged at intervals along a first direction, and the other electrically connected to the second transistor and the second transistor are arranged at intervals along the first direction.

5. The magnetic storage structure according to claim 1, wherein a given one of the magnetic tunnel junctions is positioned between the first transistor and the third transistor.

6. The magnetic storage structure according to claim 1, wherein a material of each of the spin-orbit coupling layers is at least one of platinum, tantalum, tungsten, iridium, gold, and titanium.

7. The magnetic storage structure according to claim 1, wherein a material of the free layer and a material of the fixed layer comprise at least one of cobalt iron boron, cobalt, or ferronickel.

8. A magnetic storage array structure, comprising a plurality of the magnetic storage structures according to claim 1, wherein
at least two of the plurality of magnetic storage structures are arranged at intervals along a first direction;
at least two of the plurality of magnetic storage structures are arranged at intervals along a second direction, wherein adjacent two of the plurality of magnetic storage structures along the second direction are centrosymmetric, and the third transistor of one of the two magnetic storage structures and the first transistor of other one of the two magnetic storage structures are arranged at intervals along the second direction, or, adjacent two of the plurality of magnetic storage structures along the first direction are centrosymmetric, and the third transistor of one of the two magnetic storage structures and the third transistor of other one of the two magnetic storage structures are arranged at intervals along the second direction;
the magnetic storage array structure further comprises:
a first signal line and a second signal line extending along the first direction, the magnetic storage structures arranged along the first direction being electrically connected to the same first signal line and the same second signal line; and
a first control line and a second control line extending along the second direction, the magnetic storage structures arranged along the second direction being electrically connected to the same first control line and the same second control line.

9. The magnetic storage array structure according to claim 8, wherein a given one of the two magnetic tunnel junctions electrically connected to the first transistor is a first magnetic tunnel junction, and the other electrically connected to the second transistor is a second magnetic tunnel junction;
the first magnetic tunnel junctions in the magnetic storage structures arranged along the first direction are electrically connected to the same first signal line; and
the second magnetic tunnel junctions in the magnetic storage structures arranged along the first direction are electrically connected to the same second signal line.

10. The magnetic storage array structure according to claim 8, wherein the two adjacent magnetic storage structures along the second direction are respectively a first magnetic storage structure and a second magnetic storage structure;
the same first control line is electrically connected to the first transistor and the second transistor in the first magnetic storage structure and the third transistor in the second magnetic storage structure; and
the same second control line is electrically connected to the first transistor and the second transistor in the second magnetic storage structure and the third transistor in the first magnetic storage structure.

11. The magnetic storage array structure according to claim 8, wherein
the same first control line is electrically connected to the first transistors and the second transistors in the magnetic storage structures arranged along the second direction;
the two adjacent magnetic storage structures along the first direction are respectively a first magnetic storage structure and a second magnetic storage structure; and
the same second control line is electrically connected to the third transistor in the first magnetic storage structure and the third transistor in the second magnetic storage structure.

12. The magnetic storage array structure according to claim 8, further comprising:
a first electrical connection layer in contact connection with the fixed layers of the plurality of magnetic tunnel junctions arranged along the second direction; and
a second electrical connection layer, one end of the second electrical connection layer being in contact connection with the first electrical connection layer, and other end of the second electrical connection layer being in contact connection with a source terminal or a drain terminal of the third transistor.

13. The magnetic storage array structure according to claim 8, wherein a magnetization structure direction of each of the magnetic tunnel junctions is perpendicular to a surface of each of the spin-orbit coupling layers, and the free layer being positioned on the surface of each of the spin-orbit coupling layers.

14. The magnetic storage array structure according to claim 8, wherein a magnetization structure direction of each of the magnetic tunnel junctions is parallel to a surface of each of the spin-orbit coupling layers, and the free layer being positioned on the surface of each of the spin-orbit coupling layers.

15. A memory, an array structure of the memory being arranged on a basis of the magnetic storage array structure according to claim 8.

* * * * *